US012273386B2

United States Patent
Soni

(10) Patent No.: US 12,273,386 B2
(45) Date of Patent: Apr. 8, 2025

(54) METHODS AND SYSTEM FOR PROVIDING SECURITY TO CRITICAL SYSTEMS CONNECTED TO A COMPUTER NETWORK

(71) Applicant: WhiteLint Global Pvt Ltd, New Delhi (IN)

(72) Inventor: Mohit Soni, New Delhi (IN)

(73) Assignee: WHITELINT GLOBAL PVT LTD, New Delhi (IN)

( * ) Notice: Subject to any disclaimer, the term of this patent is extended or adjusted under 35 U.S.C. 154(b) by 391 days.

(21) Appl. No.: 17/743,253

(22) Filed: May 12, 2022

(65) Prior Publication Data

US 2023/0156037 A1  May 18, 2023

(30) Foreign Application Priority Data

Nov. 12, 2021  (IN) .............................. 202111051985

(51) Int. Cl.
*H04L 9/40* (2022.01)
(52) U.S. Cl.
CPC ...... *H04L 63/1491* (2013.01); *H04L 63/1416* (2013.01); *H04L 63/1466* (2013.01)
(58) Field of Classification Search
CPC ............. H04L 63/1491; H04L 63/1416; H04L 63/1466
USPC ......................................................... 726/23
See application file for complete search history.

(56) References Cited

U.S. PATENT DOCUMENTS

| | | | |
|---|---|---|---|
| 7,797,411 B1 * | 9/2010 | Guruswamy | G06F 15/173 709/229 |
| 9,077,692 B1 * | 7/2015 | Burns | H04L 63/0428 |
| 9,191,400 B1 * | 11/2015 | Ptasinski | H04L 69/22 |
| 9,973,473 B2 | 5/2018 | White et al. | |
| 10,581,915 B2 | 3/2020 | Scherman et al. | |
| 2003/0115485 A1 * | 6/2003 | Milliken | H04L 51/212 726/24 |

(Continued)

OTHER PUBLICATIONS

Openlearn, 9.4 Packet-filtering router, Network security, The Open University, https://www.open.edu/openlearn/science-maths-technology/computing-and-ict/systems-computer/network-security/content-section-9.4, pp. 1-6.

(Continued)

*Primary Examiner* — Thanh T Le
(74) *Attorney, Agent, or Firm* — Maschoff Brennan

(57) ABSTRACT

One system for safeguarding a critical computing device is connected to an external communication network. The critical computing device stores critical data or is connected to a memory device storing critical data. The system includes a memory unit and a filtering module. The memory unit stores an entropy table having entropy values related to data packets regarding disorders in the data packets. The filtering module is connected to the external communication network and the critical computing device, receives a set of data packets through the external communication network, processes the data packets based on a set of rules, determines a processed entropy value related to each of the data packets received, fetches the entropy table and compares it with the processed entropy value, and determines if the data packets received are malicious or non-malicious and if the data packets are determined to be non-malicious data packets.

19 Claims, 2 Drawing Sheets

(56) References Cited

U.S. PATENT DOCUMENTS

| | | | | |
|---|---|---|---|---|
| 2008/0109679 | A1* | 5/2008 | Wright | H04L 63/20 714/37 |
| 2013/0097709 | A1* | 4/2013 | Basavapatna | H04L 63/1441 726/25 |
| 2013/0246627 | A1* | 9/2013 | Taylor | H04L 63/104 709/227 |
| 2014/0165177 | A1* | 6/2014 | Alagha | H04L 63/168 726/9 |
| 2015/0040228 | A1* | 2/2015 | Lee | H04L 41/40 726/25 |
| 2016/0308898 | A1 | 10/2016 | Teeple et al. | |
| 2016/0359881 | A1* | 12/2016 | Yadav | G06F 16/24578 |
| 2019/0089736 | A1* | 3/2019 | Mehta | H04L 63/1408 |
| 2019/0207976 | A1* | 7/2019 | Yadav | H04L 63/20 |
| 2019/0230064 | A1* | 7/2019 | Soman | H04L 67/141 |
| 2019/0387010 | A1* | 12/2019 | Herrmann | H04L 43/08 |
| 2020/0313986 | A1* | 10/2020 | Yadav | H04L 47/11 |
| 2020/0329069 | A1* | 10/2020 | Bjarnason | H04L 41/142 |
| 2022/0255839 | A1* | 8/2022 | Dhanabalan | H04L 63/20 |
| 2023/0027149 | A1* | 1/2023 | Kuan | H04L 63/1425 |

OTHER PUBLICATIONS

Marcello Cinque, Raffaele Della Corte and Antonio Pecchia, "Entropy-Based Security Analytics: Measurements from a Critical Information System," Jun. 2017, 47th Annual IEEE/IFIP International Conference on Dependable Systems and Networks, pp. 1-13, Naples, Italy.

* cited by examiner

METHODS AND SYSTEM FOR PROVIDING SECURITY TO CRITICAL SYSTEMS CONNECTED TO A COMPUTER NETWORK

FIELD OF THE INVENTION

The present invention relates to providing security solutions to Critical Systems which are connected to a computer network. More specifically, this invention relates to securing the Critical systems against hack attacks and malware in a computer network.

BACKGROUND OF THE INVENTION

Critical System refers to any physical system carrying vital data that needs to be protected against hack attacks and malware in a network.

When the objective is to safeguard critical information; cyber-attacks may occur at different levels. Generically speaking, after a hacker defeats our conventional firewalls, augmented firewalls and cipher systems—in order to gain unlawful access to a network—his target is to extract vital data from Critical Systems. All hardware in a network may not be Critical Systems. Yet, since all security equipment are traditionally deployed on network levels—their costing and deployment costs are as huge as the network. Once the hacker has gained access however, they are all useless.

In a level 1 scenario where the hacker is acting remotely from an external location, in
order to gain unlawful access into a network—on his success—the data lies bare awaiting his exploits inside the network.

In a level 2 scenario, during cases of internal breach—where a person from the inside
has gained illegal remote access to critical information for which he/she doesn't have any authority—the critical system lies bare for their exploitation.

In a level 3 scenario, bots or hacker, are deploying viruses, worms and other malware
to exploit vulnerable networks and critical systems-using fresh exploits and even header-less payloads.

To top it all off, if a hacker is able to gain access to critical information after breaching through a network's/system's defences, it is still not always possible to reach the perpetrator. This is largely because most practices of investigative triages and incident response are static and begin post-incident.

Accordingly, there is a need of a solution which can safeguard the Critical system and should have one or more of the following merits:
  Quantized security that works on the user's definition of critical systems and valuable data, in a network, providing secrecy and a virtual 'on-line' existence to a Critical System
  Hardware-based security guaranteeing minimum to nil 'exploitable' Vulnerabilities.
  Linux-based security control, ensuring complete customization as per user-defined requirements and protocols.
  Automating incident response.
  Live log capture.
  Low-cost deployable alternate for discouraging targeted network exploits.

U.S. Pat. No. 7,797,411B1 discloses a network device which is capable of recognizing and blocking network attacks associated with packet flows regardless of whether the packet flows are encapsulated within network tunnels. For example, the network device includes a filter module that receives packets associated with a network tunnel from an ingress device to an egress device. The filter module applies heuristics to determine whether the packets encapsulate encrypted data units. If the data units are not encrypted, the filter module extracts the data units and generates temporary packets for use within the network device. An attack detection engine within the device analyzes the temporary packets to detect any network attacks carried by the encapsulated data units. A forwarding component selectively forwards the packets to the egress device based on whether any network attacks are detected. The solution provided herein has lacuna as the technique works only on encapsulated packets, and solution works only on temporary packets for attack determination, and further the filtering module is placed in the Application layer. These lacunas either the solutions makes too limited or too risky to be used.

U.S. Pat. No. 10,581,915B2 discloses techniques to enhance network security by identifying malicious actions taken against servers in a network environment, without having to access log data from individual servers. Seed data are collected by an administrator of the network environment, from honeypots and servers whose logs are shared with the administrator, to identify patterns of malicious actions to access the network environment. These patterns of use include ratios of TCP flags in communication sessions, entropy in the use of TCP flags over the life of a communication session, and packet size metrics, which are used to develop a model of characteristic communications for an attack. These attack models are shared with servers in the network environment to detect attacks without having to examine the traffic logs of those servers.

U.S. Pat. No. 9,973,473B2 discloses methods, systems, and computer readable media for rapid filtering of opaque data traffic are disclosed. According to one method, the method includes receiving a packet containing a payload. The method also includes analyzing a portion of the payload for determining whether the packet contains compressed or encrypted data. The method further includes performing, if the packet contains compressed or encrypted data, at least one of sending the packet to an opaque traffic analysis engine for analysis, discarding the packet, logging the packet, or marking the packet.

U.S. Patent Publication No. US20160308898A1 discloses a network traffic analysis method for tracking, analyzing, and mitigating security threats in a network includes receiving information based on monitoring traffic at a plurality of layers at one or more monitors deployed in the network utilizing deep packet inspection; receiving information based on monitoring the traffic at an endpoint of the network; analyzing the monitored traffic from the endpoint and the one or more monitors to determine network infrastructure and cyber security posture of the network infrastructure; and providing visualizations based on the network infrastructure and the cyber security posture, continuously to track threats, watch lateral movement in the network of the traffic, and determine security event history in the network.

OBJECT OF THE INVENTION

The object of the invention is to provide an efficient mechanism to provide security to Critical Systems connected in a computer network against the cyber-attacks.

SUMMARY OF THE INVENTION

The object of the invention is achieved by a system for safeguarding a critical computing device connected to an external communication network.

The critical computing device either stores itself critical data or connected to a memory device storing critical data. The system includes a memory unit and a filtering module. The memory unit stores an entropy table having entropy values related to data packets regarding disorders in the data packets. The filtering module is connected to the external communication network and the critical computing device. The filtering module receives a set of data packets through the external communication network and processes the data packets based on a set of rules and determines a processed entropy value related to each of the data packets received. The filtering module further fetches the entropy table and compares it with the processed entropy value, and determines if the data packets received are malicious or non-malicious. If the data packets are determined to be non-malicious data packets, the filtering module forwards the non-malicious data packets to the critical computing device.

According to yet another embodiment of the system, the system includes an artifact generation module which receives and processes the malicious packet to generate a set of artifacts related to network parameters identifying the attacking computing device.

According to one embodiment of the system, the system includes an attack determination module communicatively coupled to the filtering module, and if the data packets are identified to be malicious data packets, the attack determination module receives and processes the malicious data packets, and determines a category of the malicious data packets to be either a malware or active attack data packets to be engaged with an active attack.

According to another embodiment of the system, wherein if the data packets are categorized as malware, the attack determination module stops the data packets for further transmission, prohibit compilation of the data packets, disconnect any communication coupling with an attacking computing device which has sent the data packets, or blocks any communication coupling request from the attacking computing device, or combination thereof.

According to yet another embodiment of the system, the system includes a dropping zone module communicatively connected to the attack determination module, wherein if the malicious data packets are categorized as the active attack data packets, the dropping zone module receives the active attack data packets, and further generates a dummy computing environment resembling the critical device, and further adapted to launch counter attack vectors along a communication port through which the active attack data packets were received.

According to one embodiment of the system, wherein the dropping zone module uses the set of artifacts, while launching counter attack vectors along a communication port through which the active attack data packets were received.

According to another embodiment of the system, wherein the dropping zone module and the attack determination module operates onto the data packets according to a communication protocol, and at least one of the dropping zone module or the attack determination module operates according to an application layer of the communication protocol.

According to yet another embodiment of the system, wherein the filtering module operates onto the data packets according to a network layer of the communication protocol, in the kernel space.

The object of the invention is also achieved by a method for safeguarding a critical computing device connected to an external communication network, wherein the critical computing device either stores itself critical data or connected to a memory device storing critical data. The method comprising steps of:
  receiving a set of data packets by a filtering module through the external communication network,
  processing of the data packets by the filtering module based on a set of rules and determining of a processed entropy value related to each of the data packets received,
  fetching the entropy table by the filtering module from the memory unit and comparing it with the processed entropy value, and determining if the data packets received are malicious or non-malicious, and if the data packets are determined to be non-malicious data packets, forwarding the non-malicious data packets to the critical computing device. The entropy table is having entropy values related to data packets regarding disorders in the data packets. The filtering module operates onto the data packets according to a network layer of a communication protocol, in the kernel space.

The object of the invention is also achieved by a non-transitory machine-readable storage medium comprising executable instructions that, when executed by one or more computing processors perform operations, the one or more computing processors are communicatively coupled to an external communication network and a critical computing device to enable transferring of data packets from the external communication network to the critical computing device after processing the data packets, the critical computing device either stores itself critical data or connected to a memory device storing critical data. The operations comprising:
  receiving a set of data packets through the external communication network,
  processing of the data packets based on a set of rules and determining of a processed entropy value related to each of the data packets received,
  fetching the entropy table from a memory unit and comparing it with the processed entropy value, and determining if the data packets received are malicious or non-malicious, and if the data packets are determined to be non-malicious data packets, forwarding the non-malicious data packets to the critical computing device.

The entropy table is having entropy values related to data packets regarding disorders in the data packets. At least one of the processors operates onto the data packets according to a network layer of a communication protocol, in the kernel space.

BRIEF DESCRIPTION OF DRAWINGS

The novel features and characteristics of the disclosure are set forth in the description. The disclosure itself, however, as well as a preferred mode of use, further objectives and advantages thereof, will best be understood by reference to the following description of an illustrative embodiment when read in conjunction with the accompanying drawings. One or more embodiments are now described, by way of example only, with reference to the accompanying drawings wherein like reference numerals represent like elements and in which.

Figure 1:
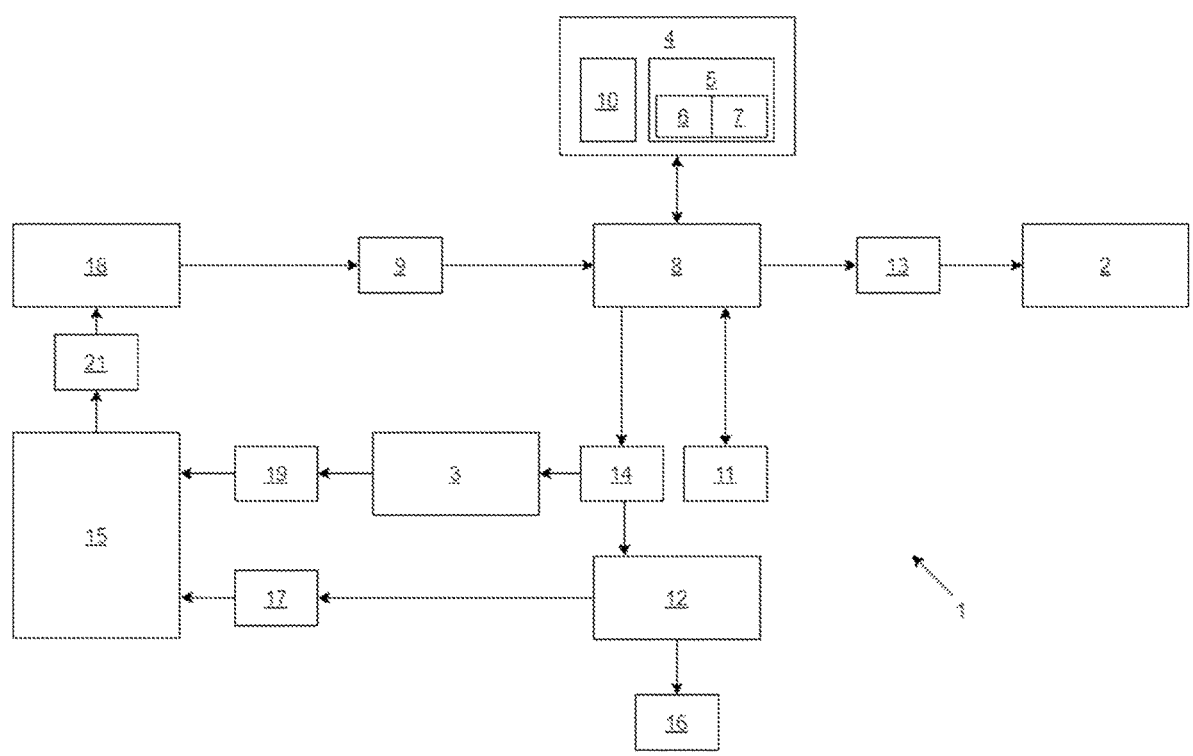
FIG. 1 is a schematic diagram of a system for safeguarding a critical computing device communicatively connected to an external communication network.

The figures depict embodiments of the disclosure for purposes of illustration only. One skilled in the art will readily recognize from the following description that alternative embodiments of the assemblies, structures and methods illustrated herein may be employed without departing from the principles of the disclosure described herein.

DESCRIPTION

For the purpose of promoting an understanding of the principles of the invention, reference will now be made to the embodiment illustrated in the figures and specific language will be used to describe them. It will nevertheless be understood that no limitation of the scope of the invention is thereby intended. Such alterations and further modifications in the illustrated system, and such further applications of the principles of the invention as would normally occur to those skilled in the art are to be construed as being within the scope of the present invention.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more sub-systems or elements or structures or components preceded by "comprises . . . a" does not, without more constraints, preclude the existence of other, sub-systems, elements, structures, components, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this invention belongs. The system, methods, and examples provided herein are only illustrative and not intended to be limiting.

Embodiments of the present invention will be described below in detail with reference to the accompanying figures.

The Application can best be understood by taking in account a real-world scenario, that of an ATM machine. An ATM is a Critical System in a bank's network. Assuming there is a nationalized bank operating in all states of our country, routinely, this bank would have a central server and several state-level zonal servers. It is obvious, that in states with higher business clients, the work load of the zonal servers is further segmented and taken up by regional servers. Each regional/zonal server will be in direct communication with every ATM Machine in that area. The ATM Machine has critical information like account/user data and an authorization to ping the central server. Control over this Critical System can allow the hacker to get confidential data and/or create false pings to release cash on site. On location control of ATM machines is impractical, owing to large scale CCTV surveillance now deployed. However, remote control is readily sought after.

The proposed solution is a system 1 for safeguarding a critical computing device 2 connected to an external communication network as depicted in FIG. 1. The system 1 has a filtering module 8 which is stationed between the external communication network and the critical computing device 2.

The system 1 has a memory unit 4 which stores an entropy table 5 having entropy values 6 related to data packets regarding disorders 7 in the data packets.

The filtering module 8 receives a set of data packets 9 through the external communication network, and processes the data packets 9 based on a set of rules 10 and determines a processed entropy value 11 related to each of the data packets 9 received. Further, the filtering module 8 fetches the entropy table 5 and compares it with the processed entropy value 11 and determines if the data packets 9 received are malicious or non-malicious. In case the data packets 9 are determined to be non-malicious data packets 13, the filtering module 8 forwards the non-malicious data packets 13 to the critical computing device 2.

The system 2 also includes an attack determination module 12 which is communicatively coupled to the filtering module 8. In case, the data packets 9 are identified to be malicious data packets 14, the attack determination module 12 receives the data packets 14 from filtering module 8 and processes them to determine a category of the malicious data packets 14 to be either a malware 16 or active attack data packets 17 to be engaged with an active attack.

In case, the data packets 9 are categorized as malware 16, the attack determination module 12 stops the data packets 9 for further transmission, or prohibit compilation of the data packets 9, or disconnects any communication coupling with an attacking computing device 18 which has sent the data packets 9, or blocks any communication coupling request from the attacking computing device 18. In one embodiment, the attack determination module 12 can carry out more than one of the above-mentioned activities with respect to malwares 16.

The system 1 also includes an artifact generation module 3 which to receives and processes the malicious packets 14, and generates a set of artifacts 19 related to network parameters identifying the attacking computing device 18.

In one embodiment, where the purpose is to only identify non-malicious packets, and route them to the critical computing device 2, the artifact generation module 223 and the attack determination module 12 may not be required.

The system further includes a dropping zone module 15 which is communicatively connected to the attack determination module 12. In case, the malicious data packets 14 are categorized as the active attack data packets 17, the dropping zone module 15 receives the active attack data packets 17, and generates a dummy computing environment resembling the critical device 2. Further, the dropping zone module 15 receives the set of artifacts 19 from the artifact generation module 3, and uses them to launch counter attack vectors 20 along a communication port through which the active attack data packets 17 were received onto the attacking computing device 18.

In one embodiment, where a counter attack is not required to be planned, the dropping zone module may not be required.

In one embodiment, the dropping zone module 15 and the attack determination module 12 operates onto the data packets 9 according to a communication protocol, and at least one of the dropping zone module 15 or the attack determination module 12 operates according to an application layer of the communication protocol.

In one embodiment, the filtering module 8 operates onto the data packets 9 according to a network layer of the communication protocol, in the kernel space.

The filtering module 8, the attack determination module 12, the dropping zone module 15, and the artifact generation module 3 are computing processors which are enabled to perform processing onto data packets as mentioned above. Each of these modules can be logical units of a single computing processor, or more than one computing processors.

The filtering module 8, the attack determination module 12, the dropping zone module 15, and the artifact generation module 3 can be envisaged in a composite computing device. This composite computing device shall be placed between the critical computing device 1 and the external communication network. Accordingly, all traffic shall through this composite computing device. Normal flow would be routed to the critical computing device 2 seamlessly, whereas the malicious traffic would be contained and the origin IP would be blocked by the composite computing device. As a result, malicious network packets will never reach the critical computing device 2.

The composite computing device is a well-defined intermediate device. It is a special purpose off-the-shelf single board computer that performs the below mentioned functions:

It places the critical computing device in its NAT making it virtually unapproachable.

It captures all network packets before they reach the critical computing device.

It performs analysis for detection of malicious packets in its kernel space, based on programmed criteria.

Performs automated incident response management from collected artifacts.

Performs counter attack whenever desired, based on the collected artifacts.

Figure 2:
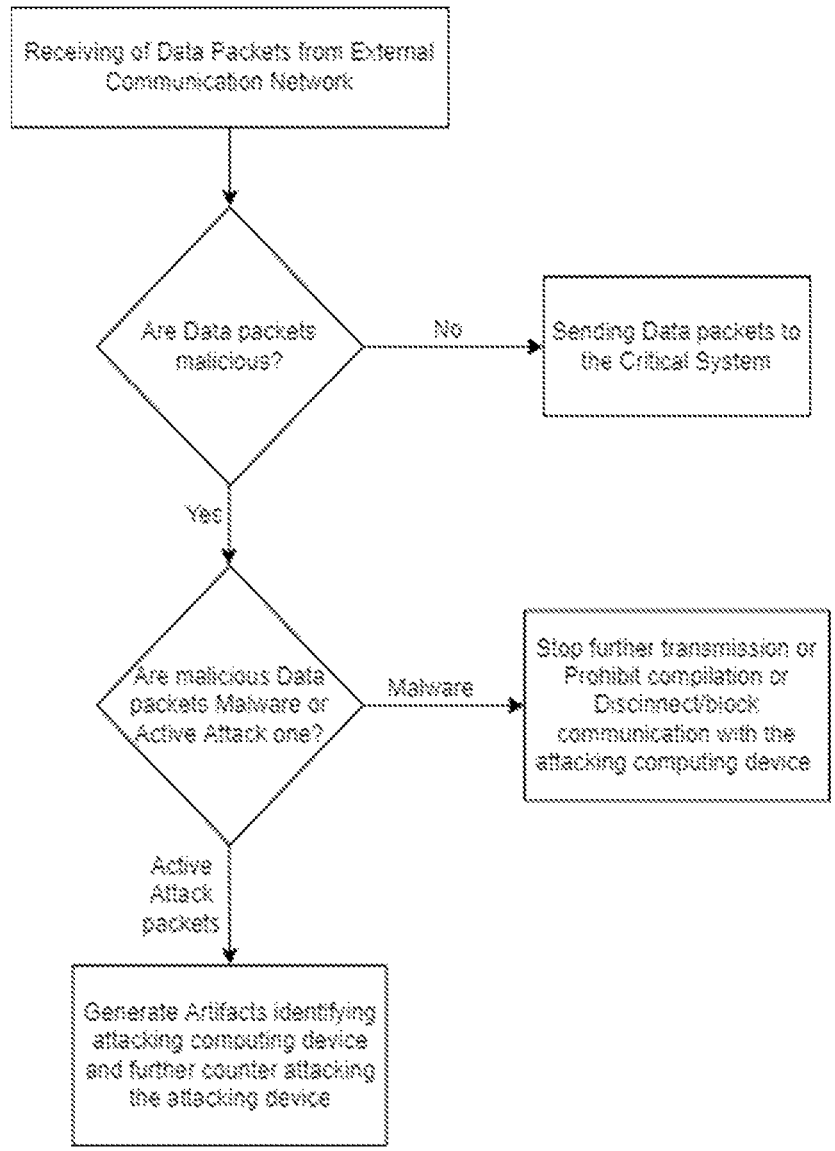
FIG. 2 is a schematic flow diagram of a method for safeguarding a critical computing device communicatively connected to an external communication network.

Further, FIG. 2 is elaborated to describe method flow for safeguarding a critical computing device communicatively connected to an external communication network using the above-mentioned composite computing device.

Any and all network traffic passes through the filtering module in any linux-based machine, which is in the network layer of the composite computing device. Customised hooks have been built as network kernel inserts which can filter this incoming data for malware. A similar hook has been built to calculate the entropy of each network packet individually. These values travel to the next kernel insert, where a decision is made for the data packets being malicious or not using an entropy table having entropy values related to data packets regarding disorders in the data packets. These stages are crossed through by all network packets. Based on the inputs from the proprietary library, normal traffic is routed to the inbuilt routing module-which simply transfers these to the critical system. Malicious traffic, on the other hand, is first utilized to generate forensic artifacts of the source. It is then contained and routed from the network layer to the application layer.

In the application layer, the attack vector is identified. If the attack vector is a bot or a malware—it is quarantined and deleted. If the attack vector is an active attacker, it is sent to the dropping zone module which is a customised honeypot meant to deviate the attacker's attention. This honeypot would be disguised as the critical computing device and will offer a dummy encryption and pseudo data to the attacker. Meanwhile, the generated artifacts will be utilised to create a counter attack package which will be fired back to the attacker along the same port and channel he is using to reach the critical computing device.

This proposed solution deals with all kinds of network packets and not just opaque or encapsulated or encrypted ones. The new range of malware are not found to be as complicated as they used to be. Small kernels disguising as components of programs have also proven to be potent attack vectors. Basing our algorithm to check a specific kind of packet for its compositional integrity left the system vulnerable. Therefore, a complete scanning of all network packets is performed using the present solution.

In embodiment where the filtering module performs function in the network layer where it is inserted in kernel space, it makes the performance of the system immaculate but it also ensures that no malicious packet—ever reaches the user space and the critical computing device.

The composite computing device does not create any cache or temporary packets. It analyses all network packets in real-time. This increases the overall performance of the device and does away with additional process—buffer requirements, making the algorithm computationally cheaper and the device much faster.

One implementation of the solution is discussed through an ATM network implementation. In the ATM network, the information flows from the server side to the ATM which is the critical computing device of the network.

The ATM needs to be replaced by the composite computing device. This means, that the composite computing device needs to be in exact network configuration as the critical computing device. The composite computing device now takes up the public IP originally assigned to the ATM Machine and creates a NAT of its own. The critical computing device now is placed in the private IP of the composite computing device. All data packets meant to be received by the critical computing device will only come through the composite computing device. The routing policies of the composite computing device can be configured to enable this. The routing policies of the critical computing device and the central/zonal/regional servers can also be configured to accommodate this arrangement.

To an attacker now, this configuration will not be visible from outside. To a routine hacker scanning the network layout, there would be visible an embedded machine (like an ATM itself) with a public IP. The actual ATM Machine however, becomes virtually 'absent' on the network. It is now a part of the network through a NAT created by the composite computing device—not receiving direct packet flow.

However, if the incoming packet is found to be malicious, the flow terminates as the malicious packet is routed to the dropping zone module housed by the composite computing device.

In the current embodiment, the composite computing device is a Linux based Single Board Computer that has its network policies governed by an iptable. Customizing this iptable allows the proposed device to be flexible. iptables traditionally allow complete control over routing of packets. The server-side packets will now be received first by the composite computing device. Before interaction of any data packet on the network layer with the iptable of the composite computing device, lie several network hooks.

In a scenario where the server side has been compromised, the data packets sent to the critical computing device, may be malicious. Therefor it can't be received by the device without being filtered. The filtering module is a utility that provides several hooks on the network layer. These hooks can be utilised at different times to filter traffic received by a critical computing device.

NF_IP_PRE_ROUTING is a special network hook meant to receive data packets in the network layer, before they hit the iptables. This hook may be supplemented by kernel inserts customizing the process of packet filtering.

The composite computing device introduces a maverick entropy-based packet filtering strategy that aims at visualizing a mal-packet and then comparing it to information stored in its internal library/entropy table having entropy values related to data packets regarding disorders in the data packets. This technique of entropy-based imaging has allowed the researchers to extract characteristics from the content of the packet. The malicious data packets may be packed or unpacked, but it can be easily parsed to calculate a probabilistic score to estimate its contents. This is called its entropy. The entropy of a packet is high when the probability of it carrying mal-instructions in its code is high. If the value of entropy falls within a pre-decided threshold the packet may be deemed malicious, else safe. A trade-off between the False Acceptance Rates and the False Rejection Rates can enable the fixing of the extents of security required by the critical computing device.

The internal library mentioned above is a set of values of entropy of various kinds of network packets, which has been built through tedious and intensive testing. This internal library along with the approach employed, makes the product unique and irreplicable. If the packet is found to be malicious, it is routed to the dropping zone module.

This dropping zone module has a software-based honeypot. This is customized to enable generation of critical attacker logs. This has been customized to capture mal-packets from the network hook directly. This is also capable of simulating the exact environment of any critical computing device. If the attack is happening live, with the attacker's bot/exploit caught live by the dropping zone module, then the module is designed to occupy the attacker in such a way that the attacker can spend time in the honeypot.

The captured packet/bot can be utilized to produce forensically relevant information. These are referred to as forensic artifacts. Artifacts constitute the kind of information that may be employed to incriminate an individual. This refers to directly identifying the IP, MAC, Port, Protocol and User Name and Password of the incoming socket connection. These bits of information are not randomly available in all honeypots, they need to be customized in order to reveal this information.

A public-IP address is routinely sufficient to determine the identity and the geography of an attacker. However, the problem of fake IPs or IP-Masking by the use of VPNs is quite common these days. Live capturing of network logs enables the proposed system, to counter this problem.

It was experimentally observed, that the public IP that the user was using to interact with his VPN client was also made visible when the client was using 'free' browser-extension based services. It was then observed that the VPN client simply rewrites the destination's logs and replaces the fake IP with the real one. In post analysis, only the re-written log would be showing the source of the incoming socket to be fake. In live capture however, the original IP is first observed and when it is time to write the log in the destination, the IP allotted by the VPN extension then gets re-written. The proposed product overcomes this problem.

All generated log information, is then, converted to a convenient report and can be communicated to the nearest police station via email or sms.

All artifacts generated can provide a precursor for customized RAT (Remote Administration Tool) generation. Customized RATs may then be fired on the same port to attain a full control of the attacker's system during his attack itself.

The invention claimed is:

1. A system for safeguarding a critical computing device connected to an external communication network, wherein the critical computing device either stores itself critical data or connected to a first memory device storing critical data, the system comprising:

a second memory device adapted to store an entropy table having entropy values related to data packets regarding disorders in the data packets; and a first one or more computing processors connected to the external communication network and the critical computing device, to receive a set of data packets through the external communication network, process the data packets based on a set of rules to determine a processed entropy value related to each of the data packets received, further adapted to fetch the entropy table and compare with the processed entropy value, to categorise the data packets received as malicious or non-malicious, and forward the non-malicious data packets to the critical computing device, wherein the malicious data packets are defined as malware or active attack data packets to be engaged with an active attack, and wherein the first one or more computing processors operates onto the data packets according to a network layer of a communication protocol, in a kernel space.

2. The system of claim 1, further comprising a second one or more computing processors adapted to process the malicious packet, and to generate a set of artifacts related to network parameters identifying an attacking computing device which has sent the data packets.

3. The system of claim 1, further comprising a third one or more computing processors adapted to process the malicious data packets, and determine a category of the malicious data packets to be either the malware or the active attack data packets to be engaged with the active attack.

4. The system of claim 3, wherein on categorizing the data packets as malware, the third one or more computing processors are adapted to stop the data packets for further transmission, prohibit compilation of the data packets, disconnect any communication coupling with an attacking computing device which has sent the data packets, or blocks any communication coupling request from the attacking computing device, or combination thereof.

5. The system of claim 3, wherein on categorizing the malicious data packets to be the active attack data packets, the third one or more computing processors are adapted to receive the active attack data packets, further generate a dummy computing environment resembling the critical device, and further adapted to launch counter attack vectors along a communication port through which the active attack data packets were received.

6. The system of claim 5, further comprising the second one or more computing processors are adapted to receive and process the malicious packet to generate a set of artifacts related to network parameters identifying the attacking computing device, and using the set of artifacts to launch counter attack vectors along a communication port through which the active attack data packets were received.

7. The system of claim 5, wherein the third one or more computing processors are operates onto the data packets according to a communication protocol, and at least one of the computing processors operates according to an application layer of the communication protocol.

8. A method for safeguarding a critical computing device connected to an external communication network, wherein the critical computing device either stores itself critical data or connected to a first memory device storing critical data, the method comprising:
- receiving a set of data packets by a first one or more computing processors through the external communication network;
- processing of the data packets by the first one or more computing processors based on a set of rules and determining of a processed entropy value related to each of the data packets received;
- fetching the entropy table by the first one or more computing processors from a second memory device, comparing it with the processed entropy value, categorizing the data packets received as malicious or non-malicious, and forwarding the non-malicious data packets to the critical computing device, wherein the entropy table is having entropy values related to data packets regarding disorders in the data packets,
- wherein the malicious data packets are defined as malware or active attack data packets to be engaged with an active attack, and
- wherein the first one or more computing processors operates onto the data packets according to a network layer of a communication protocol, in a kernel space.

9. The method of claim 8, further comprising receiving and processing the malicious packet by a second one or more computing processors, and generating a set of artifacts related to network parameters identifying the attacking computing device.

10. The method of claim 8, further comprising:
- sending the malicious data packets by the first one or more computing processors; and
- processing of the malicious data packets by a third one or more computing processors, and determining a category of the malicious data packets to be either the malware or the active attack data packets to be engaged with the active attack,
- wherein the third one or more computing processors operates onto the data packets according to an application layer of the communication protocol.

11. The method of claim 10, further comprising:
- stopping the data packets categorised as malware for further transmission by the third one or more computing processors;
- prohibiting compilation of the data packets;
- disconnecting any communication coupling with an attacking computing device which has sent the data packets; and
- blocking any communication coupling request from the attacking computing device.

12. The method of claim 10, further comprising:
- receiving the active attack data packets categorized as the active attack data packets by the third one or more computing processors,
- generating a dummy computing environment resembling the critical device by the third one or more computing processors; and
- launching counter attack vectors along a communication port through which the active attack data packets were received,
- wherein the third one or more computing processors operates onto the data packets according to an application layer of the communication protocol.

13. The method of claim 12, further comprising:
- receiving and processing the malicious packet by a second one or more computing processors, and generating a set of artifacts related to network parameters identifying the attacking computing device;
- receiving the set of artifacts by the third one or more computing processors; and
- using the set of artifacts by the third one or more computing processors to launch counter attack vectors along a communication port through which the active attack data packets were received.

14. A non-transitory machine-readable storage medium comprising executable instructions that, when executed by one or more computing processors perform operations, the one or more computing processors are communicatively coupled to an external communication network and a critical computing device to enable transferring of data packets from the external communication network to the critical computing device after processing the data packets, the critical computing device either stores itself critical data or connected to a memory device storing critical data, the operations comprising:
- receiving a set of data packets through the external communication network;
- processing of the data packets based on a set of rules, determining of a processed entropy value related to each of the data packets received; and
- fetching the entropy table from a memory unit, comparing it with the processed entropy value, and categorising the data packets received as malicious or non-malicious, and forwarding the non-malicious data packets to the critical computing device;
- wherein the entropy table is having entropy values related to data packets regarding disorders in the data packets; and
- wherein the malicious data packets are defined as malware or active attack data packets to be engaged with an active attack, and
- wherein at least one of the computing processors operates onto the data packets according to a network layer of a communication protocol, in a kernel space.

15. The non-transitory machine-readable storage medium of claim 14, wherein the one or more computing processors further performs operation comprising receiving and processing the malicious packet, and generating a set of artifacts related to network parameters identifying the attacking computing device.

16. The non-transitory machine-readable storage medium of claim 14, wherein on identifying the data packets to be malicious data packets, the one or more computing processors further performs operation comprising:
- processing of the malicious data packets and determining a category of the malicious data packets to be either a malware or active attack data packets to be engaged with an active attack;
- wherein at least one of the processors operates onto the data packets according to an application layer of the communication protocol.

17. The non-transitory machine-readable storage medium of claim 16, wherein, on categorizing the data packets as malware, the one or more computing processors further performs one or more of the following operations:
- stopping the data packets categorized as malware for further transmission;
- prohibiting compilation of the data packets;
- disconnecting any communication coupling with an attacking computing device which has sent the data packets; and
- blocking any communication coupling request from the attacking computing device.

18. The non-transitory machine-readable storage medium of claim 16, wherein, on categorizing the malicious data packets as the active attack data packets, the one or more computing processors further performs operation comprising:
   receiving the active attack data packets;
   generating a dummy computing environment resembling the critical device; and
   launching counter attack vectors along a communication port through which the active attack data packets were received.

19. The non-transitory machine-readable storage medium of claim 18, wherein the one or more computing processors further performs operation comprising:
   receiving and processing the malicious packet, and generating a set of artifacts related to network parameters identifying the attacking computing device, and
   using the set of artifacts to launch counter attack vectors along a communication port through which the active attack data packets were received.

* * * * *